May 9, 1933. S. S. FURRER 1,907,946
ROTARY HARROW
Filed April 2, 1932 4 Sheets-Sheet 3

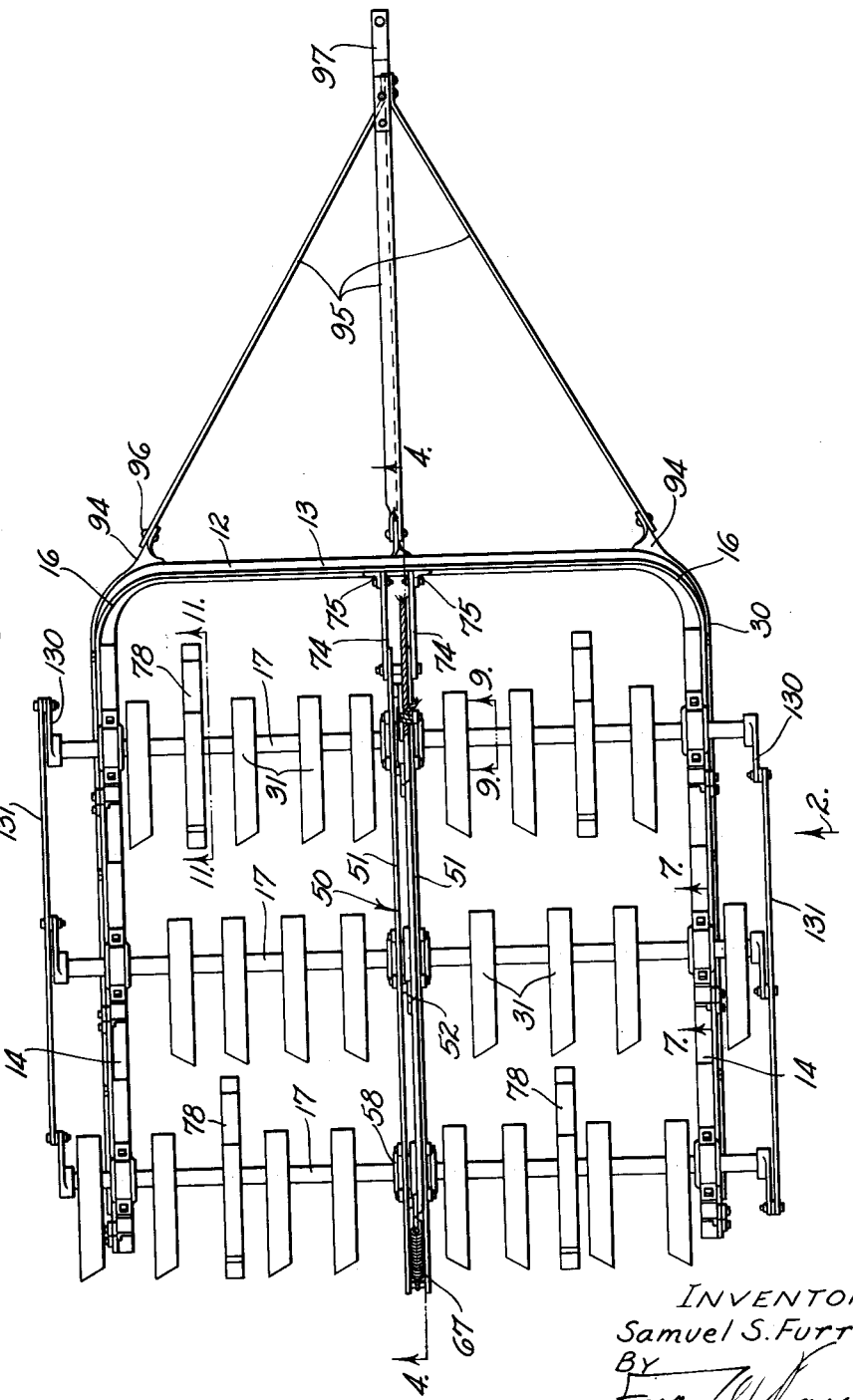

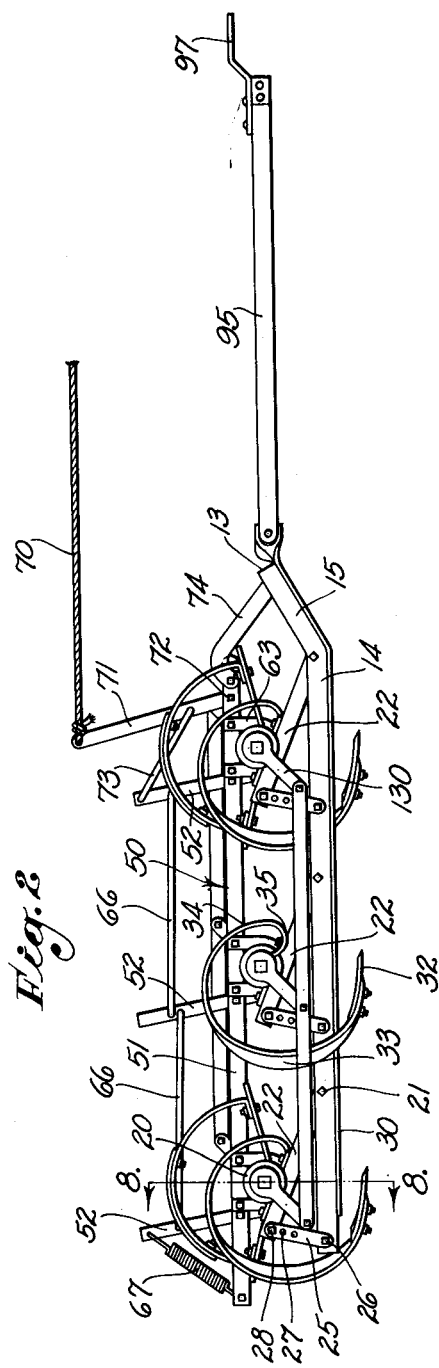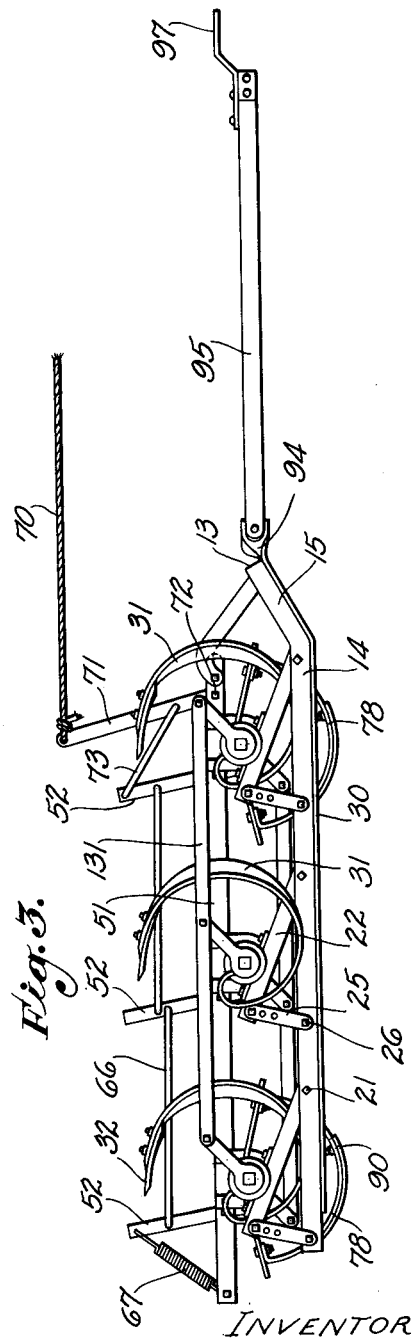

INVENTOR:
Samuel S. Furrer,
BY
ATTORNEY.

May 9, 1933.     S. S. FURRER     1,907,946
ROTARY HARROW
Filed April 2, 1932     4 Sheets-Sheet 4
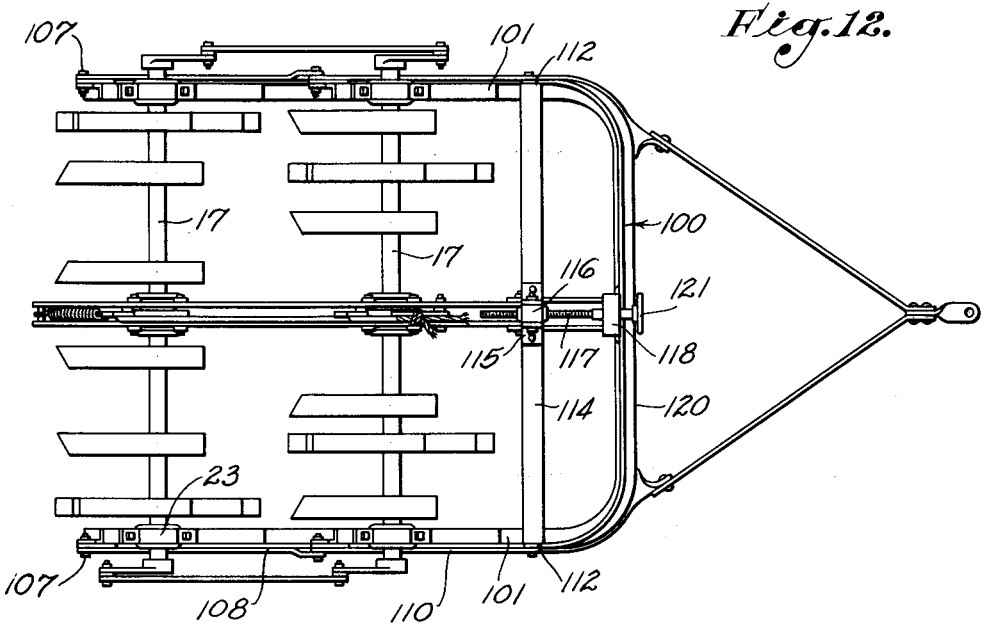
Fig. 12.
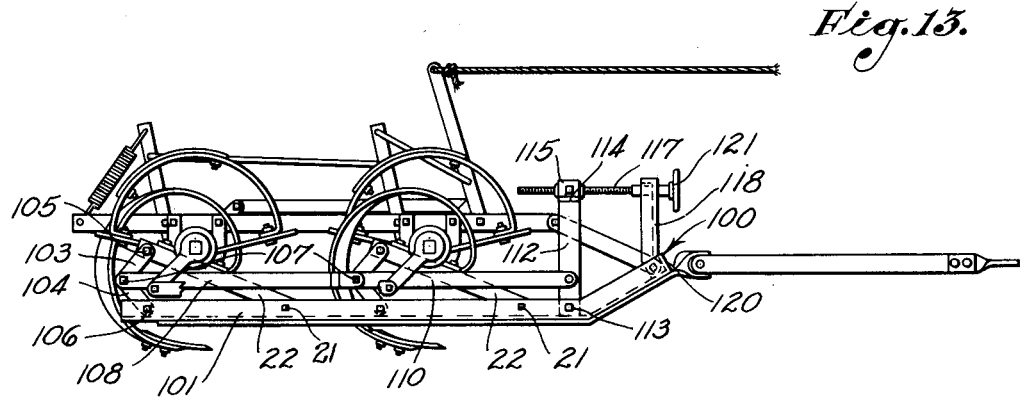
Fig. 13.
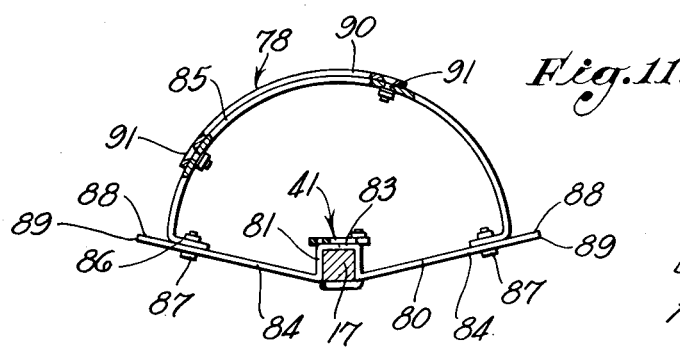
Fig. 11.
INVENTOR:
Samuel S. Furrer,
BY
ATTORNEY.

Patented May 9, 1933

1,907,946

UNITED STATES PATENT OFFICE

SAMUEL S. FURRER, OF OXNARD, CALIFORNIA, ASSIGNOR TO BRENNEIS MANUFACTURING COMPANY, OF OXNARD, CALIFORNIA, A CORPORATION OF CALIFORNIA

ROTARY HARROW

Application filed April 2, 1932. Serial No. 602,719.

My invention relates to agricultural implements, and relates particularly to implements of the harrow type and especially to spring tooth harrows, and is an improvement on harrows of the character shown in the patent issued November 10, 1931 to James S. Stewart, No. 1,831,041.

Devices such as harrows are extensively used in cultivating the soil, either for the purpose of preparing it for planting or for keeping the soil in a loose and finely divided condition to prevent vaporization of water from the soil and to maintain a maximum of aeration. For purposes such as above indicated spring tooth harrows are employed. Naturally, the teeth of these harrows pick up refuse materials such as weeds, sticks, etc., and carry such materials along therewith. To enable the dumping of the accumulated materials it is customary to mount the teeth of the harrow so that they may be released and swung rearwardly and upwardly to drop the accumulations therefrom. Harrows of this type are frequently equipped with means for returning and locking the harrow teeth in operative position, such means being frequently actuated in consequence of the backing up of the draft device or tractor which is employed to pull the harrow.

In the general form of harrow to which my invention particularly relates, curved spring teeth are mounted on an axle or shaft which is rotatably secured to a frame. Accordingly, the shaft may rotate so that the harrow teeth swing from upwardly pointing position to downwardly pointing position, latch means being provided for stopping the shaft with the teeth in raised position and out of engagement with the ground or in lowered position and in engagement with the ground.

My present invention comprehends a simple means whereby the depth to which the teeth may penetrate into the ground may be controlled and varied to suit requirements of the various users. In the preferred practice of this part of my invention the axle on which the harrow teeth are mounted is secured to a frame having runners adapted to engage the ground when the teeth have penetrated the ground to their intended working depth. This securing means is vertically adjustable so that the distance between the axis of the axle and the runners of the frame may be varied and the extension of the harrow teeth downwardly beyond the plane of the runners thereby determined.

A further object of the invention is to provide a means for simultaneously adjusting both ends of the shaft relative to the frame of the harrow or for simultaneously adjusting a plurality of shafts relative to a harrow frame.

A further object of the invention is to provide a simple and effective latch means for controlling the rotation of the axles, this latch means being preferably of folding character so that it automatically takes a position of adjustment corresponding to the position into which the axles have been adjusted relative to the harrow frame.

A further object of the invention is to provide a simple and sturdy means for securing spring-type harrow teeth to a supporting bar or axle.

A further object of the invention is to provide a simple form of segmental wheel or runner for supporting the harrow when the teeth thereof are in raised or in inoperative position.

Further objects and advantages of the invention will be made evident hereinafter.

Referring to the drawings which are for illustrative purposes only,

Fig. 1 is a plan view of the preferred embodiment of my invention with the teeth thereof in working position.

Fig. 2 is a side elevation, viewing the harrow as indicated by the arrow 2 of Fig. 1.

Fig. 3 is a side elevation similar to Fig. 2 but showing the harrow teeth in raised position.

Fig. 11 is an enlarged section on a plane represented by the line 11—11 of Fig. 1 showing the simple manner of construction.

Fig. 12 is a plan view of a form of my invention having an alternative form of adjusting means.

Fig. 13 is a side elevation of Fig. 12.

Figure 7:
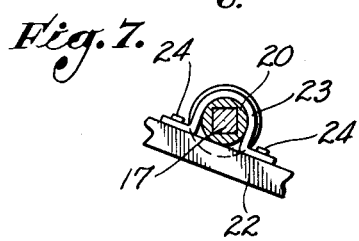
Fig. 7 is a fragmentary section on a plane represented by the line 7—7 of Fig. 1.
Figure 8:
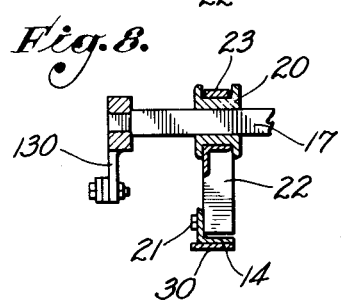
Fig. 8 is an enlarged fragmentary section on a plane represented by the line 8—8 of Fig. 2.

As shown in Figs. 1, 2, and 3, the preferred form of my new harrow includes a frame 12 consisting of a structural angle bent to U-shaped form so as to provide a front bar 13 and legs 14 extending rearwardly from the ends thereof. The front ends 15 of the legs 14 are bent upwardly as shown in Figs. 2 and 3 and are joined to the front bar 13 by bends 16, the front bar 13 being supported in raised position. Extending laterally and horizontally across the frame 12 are axles 17 of square cross-section, and as shown in Figs. 7 and 8 flanged bearing spools 20 are secured near the ends of the axles 17 in positions aligned with the legs 14 of the frame 12. By means of bolts 21 extended through the upright legs of the angles forming the legs 14, the lower ends of levers 22 are pivotally secured to the frame. These levers 22, as shown in Fig. 8, may also be made from structural angles. The levers 22 are disposed in sloping position as shown in Figs. 2 and 3, and the spools 20 are rotatably secured on the upper faces thereof by straps 23 which are fastened to the levers 22 by means of screws or bolts 24 and fit between the flanges of the spools 20 with such looseness that the spools may readily turn therein. The upper ends of the levers 22 are adjustably secured to the legs 14 by means of links 25, the lower ends of which are pivotally attached to the legs 14 by use of bolts 26 and the upper ends of which are provided with spaced openings 27 through which bolts 28 may be passed into engagement with openings in the upper ends of the levers 22. The slope of the levers 22 and likewise the distance between the axles 17 and the lower faces of wear plates 30 secured to the lower faces of the legs 14 may be varied by changing the bolts 28 from one to another of the holes 27 in each of the links 25.

Figure 10:
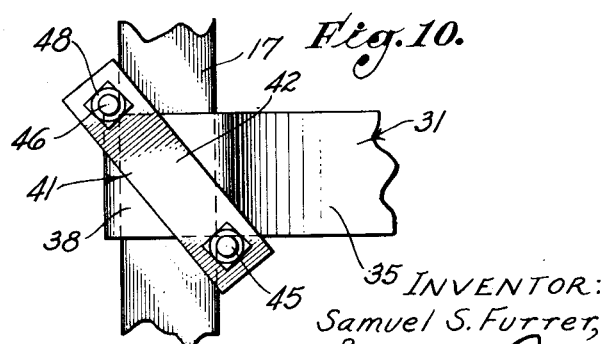
Fig. 10 is a plan view corresponding to Fig. 9.
Figure 9:
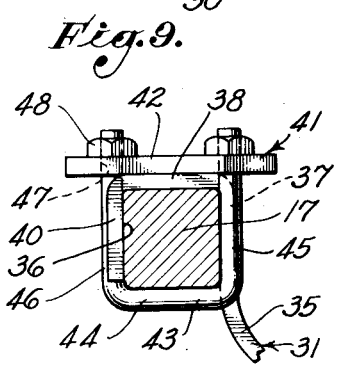
Fig. 9 is an enlarged fragmentary section on a plane represented by the line 9—9 of Fig. 1 showing the means for securing the harrow teeth to the axle or supporting bar of the harrow.

On each of the axles 17 a plurality of spring teeth 31 are mounted, these spring teeth each having, as shown in Fig. 2, a replaceable steel point member 32 secured to the lower end of a circularly curved steel bar 33 which passes rearwardly from the point 32 upwardly behind the axle on which it is mounted, forwardly over such axle and then downwardly, as indicated at 34, to connect with the axle 17 through a gooseneck or inverted U-shaped portion 35 which, as shown in Figs. 9 and 10, terminates in an inverted channel 36 formed by bending the upper extremity of the bar 33 in such a manner that three walls 37, 38, and 40 are disposed at right angles and thereby define a downwardly facing channel or depression of such size that the axle 17 may be received therein. Each spring tooth 31 is secured to an axle 17 by use of a clamping means 41 which surrounds the axle 17 and provides a part 42 which forces the wall, lying behind the depression in the axle 17, against the axle. The clamping means 41 is of U-bolt type and includes a U-bolt proper 43 having a base portion 44 with legs 45 and 46 bent upwardly from the ends thereof. The base portion 44 is of such length that the legs 45 and 46 will lie adjacent diagonally opposite corners of the wall 38, as shown in Figs. 9 and 10. The member 42 consists of a clamping plate adapted to extend diagonally across the wall 38 and having holes 47 therein for receiving the legs 45 and 46 of the U-bolt 44, there being nuts 48 on the ends of the legs 45 and 46 for forcing the plate 42 toward the wall 38. This securing means for the teeth 31 avoids the use of bolt holes in the axles or the teeth 31 and thereby maintains maximum strength in the connecting parts.

Extending longitudinally across the axle 17 is a bar structure 50 consisting of a floating pair of steel bars 51 which are disposed in on-edge position and are spaced apart so as to extend on opposite sides of latched levers 52 which are disposed in upright positions in a vertical and longitudinal plane, the levers 52 being pivoted on bolts 53 which extend laterally through the bars 51 and spacing washers or collars 54 placed on opposite sides of the levers 52. The lower ends 55 of the levers 52 are shaped in the form of engagers or pawls adapted to engage dogs or abutments 56 or 57 formed in diametrically opposing positions on annular members 58 which are provided with square openings 60 and are placed on the central portions of the axle 17 below the bar structure 50.

Figure 4:
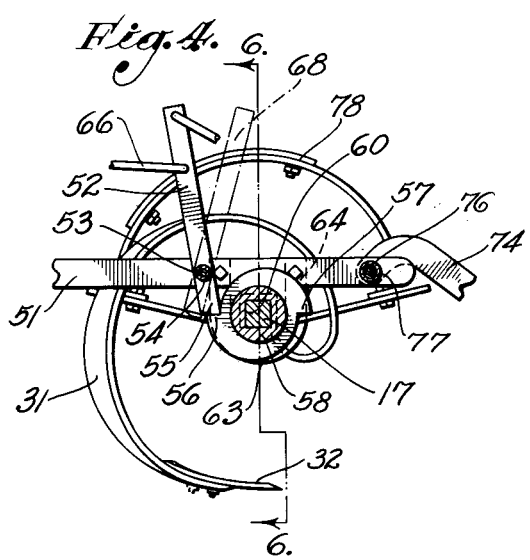
Fig. 4 is an enlarged fragmentary section on the central plane indicated by the line 4—4 of Fig. 1, showing the latch means associated with the forward axle or shaft of the harrow, it being understood that the latch means associated with the remaining axles are duplicates of the disclosure of Fig. 4.
Figure 5:
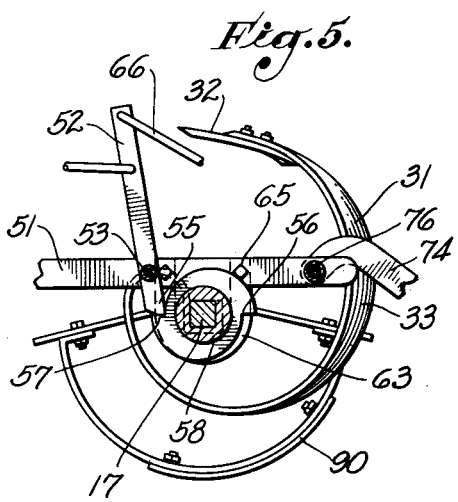
Fig. 5 is a view similar to Fig. 4 showing the latch holding the harrow teeth in raised position.
Figure 6:
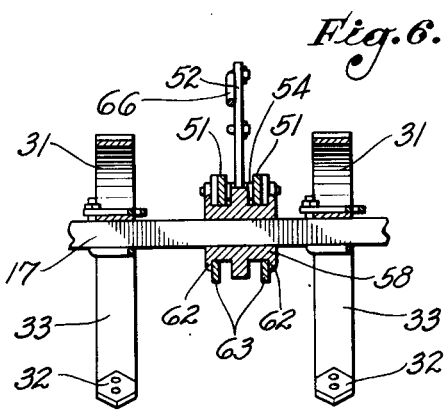
Fig. 6 is a section on a plane represented by the line 6—6 of Fig. 4.

As clearly shown in Fig. 6, each annular or rotary latch member 58 has radial flanges 62 at the ends thereof and on opposite sides of the central flange portions of the annular members 58 containing the dogs or abutments 56 and 57, which flanges project over the outer faces of U-shaped straps 63 which extend downwardly from the bars 51 of the bar structure 50. As clearly shown in Figs. 4, 5, and 6, the straps 63, being bent to U-shaped form, are disposed around the members 58 with the legs 64 thereof pointed upwardly, and these legs 64 are secured to the bars 51 by means of bolts 65. The levers 52 are interconnected by links 66 so that they will swing simultaneously, and a spring 67 is connected between the rearward end of the bar structure 50 and the rearward lever 52 to provide a means for normally holding the levers in rearwardly sloping position as shown in Figs. 2, 4, and 5. For the purpose of swinging the levers 52 forwardly into the position indicated by dotted lines 68 in Fig. 4, whereby to swing the lower ends or engagers 55 thereof from engagement with dogs or shoulders 56 and 57 of the rotary latch members 58, a rope 70 is extended from the pulling vehicle, such as a tractor, to a lever 71 which is pivoted by means of a bolt 72 to the forward portion of the bar structure 50 and is connected to the forward lever 52 by means of a link 73. Diagonal links 74 connect the forward end of the bar structure 50 to the front member 13 of the frame 12. These links 74 are pivotally connected at their lower or forward ends to brackets or clips 75 mounted on the front portion 13 of the frame 12, and their rearward ends engage a bolt 76 which extends through the forward ends of the bars 51 and through a spacing sleeve 77 which separates the forward ends of the bars 51. On the first and last of the axles 17 wheel segments 78 are mounted so as to project vertically from the axles 17 in directions opposite from the points 32 of the harrow teeth 31. As shown in Fig. 11, each wheel segment comprises a substantially diametral bar 80 having a central portion bent into the shape of a channel or U 81 of a size to fit over the axle 17, a U-bolt clamping device 41 of the character described in detail in Figs. 9 and 10 being employed to clamp the bottom wall 83 of the channel 81 against the axle 17. The ends 84 of the bar 80 are preferably bent upwardly relative to a diametral plane, as shown in Fig. 11, and a semi-circularly curved steel strap 85 having its ends inwardly bent to form bracket plates 86 is secured to the bar 80 by means of bolts 87 which pass through openings in the bracket plates 86 and the bar 80. The bar 80 is of greater length than the diameter of the curved strap 85 so that the extremities 88 thereof project beyond the ends of the strap 85 and form points 89 for engaging the ground. On the forward portion of each circularly curved strap 85 a wear plate or shoe 90 is secured by means of countersunk bolts 91.

In Figs. 1, 2, and 4, the harrow teeth are shown in operative position, the points 32 thereof projecting below the horizontal plane of the wear plates 30 of the frame 12. Ends 55 of the levers 52 are at this time in engagement with the stops or abutments 56 of the members 58, thereby preventing rotation of the axles 17 and the teeth 31 and wheel segments 78 mounted thereon. As previously explained, the depth of penetration of the points 32 into the soil is determined by the effective length of the links 25 which support the levers 22, thereby controlling the spacing of the axles 17 vertically from the lower faces of the wear plates 30. A forward pull on the rope 70 is transmitted through the links 73 and 66 to all of the levers 52, swinging them forwardly into the dotted line position 68 of Fig. 4, freeing the lower ends 55 from engagement with the abutments 56, with the result that the axles 17 may rotate forwardly. If the rope 70 is released before the members 58 have rotated through a half turn, the lower ends 55 of the levers 52 will engage the abutments 57 and hold the axles 17 in the position shown in Figs. 3 and 5, with the wear plates 90 of the runners or segmental wheels in engagement with the ground and with the teeth 31 in raised position. A consecutive releasing actuation of the levers 52 will result in the rolling of the axles 17 through a consecutive half turn, bringing the teeth 31 again into lowered or working position. Rotation of the axles 17 is synchronized by use of cranks 130 mounted on the ends of the axles 17, as shown, and connected together by links 131. Any type of draft means may be employed for pulling the harrow forwardly. In the drawings I have shown brackets 94 at the forward end of the frame 12 to which pull bars 95 may be secured by eye-bolts 96, the forward ends of the pull bars 95 being connected to a draft hitch 97.

My invention, as shown in Figs. 12 and 13 includes means for quickly and simultaneously adjusting the vertical spacing of the axles 17 relative to a frame 100. In this latter form of my invention I show a harrow having two axles 17 instead of three, which axles are mounted by use of straps 23 on levers 22 pivotally secured to the side bars 101 of the frame 100 by means of bolts 21. The outer ends of the levers 22 are connected to the side members 101 of the frame 100 by toggle links 103 and 104 which are respectively pivotally connected to the members 22 and 101 at 105 and 106 and are pivotally connected together by means of a bolt 107. The central pivots of the toggle means formed by the bolts 107 are connected through links 108 and 110 to lever members 112, the lower ends of which are pivotally mounted on bolts 113 and the upper ends of which are connected by means of a cross bar 114. By means of angle clips 115 a nut 116 is mounted on the cross bar 114 and a screw 117 engaging such nut 116 is extended to a bracket 118 mounted on the front bar 120 of the frame 100. A handle 121, on the forward end of the screw 117, enables the screw to be rotated with the result that the nut 116 is moved relative to the bracket 118 and the levers 112 are correspondingly swung on the pivots provided by the bolts 113, such movement of the levers being transmitted through the links 108 and 110 to the bolts 107 of the toggle means, collapsing or extending the toggle means and correspondingly raising or lowering levers 22 and the axle 17 relative to the side members 101 of the frame 100.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A cultivator of the character described, including: a frame having means adapted to engage the ground so as to limit the proximity of said frame to the ground; a plurality of axles supported in horizontal laterally extending positions on said frame; a floating bar separate from said frame extending across said axles; latch means cooperative between said floating bar and said axles for controlling the rotation thereof; and ground engaging tools mounted on said axles so as to rotate with said axles between positions of engagement and non-engagement with the ground.

2. A cultivator of the character described, including: a frame having means adapted to engage the ground so as to limit the proximity of said frame to the ground; a plurality of axles disposed in laterally extending horizontal positions on said frame; means adjustably securing said axles to said frame whereby to vary the positions of said axles vertically relative to said frame; a floating bar extending across said axles; latch means cooperative between said floating bar and said axles for controlling the rotation thereof; and ground engaging tools mounted on said axles so as to rotate with said axles between positions of engagement and non-engagement with the ground.

3. A cultivator of the character described, including: a frame; a plurality of axles supported in horizontal laterally extending positions on said frame; a floating bar extending across said axles; members extending from said floating bar so as to substantially surround the portions of said axles adjacent said floating bar; a dog member on each of said axles; a plurality of engagers movably secured to said floating bar in positions to engage said dog members and thereby control rotation of said axles and means connecting said engagers whereby they may be simultaneously actuated; and ground engaging tools mounted on said axles so as to rotate with said axles between positions of engagement and non-engagement with the ground.

4. A cultivator of the character described, including: a frame having means adapted to engage the ground so as to limit the proximity of said frame to the ground; a plurality of axles disposed in laterally extending horizontal positions; means adjustably securing said axles to said frame whereby to vary the positions of said axles vertically relative to said frame; a floating bar extending across said axles; members extending from said floating bar so as to substantially surround the portions of said axles adjacent said floating bar; a dog member on each of said axles; a plurality of engagers movably secured to said floating bar in positions to engage said dog members and thereby control rotation of said axles and means connecting said engagers whereby they may be simultaneously actuated; and ground engaging tools mounted on said axles so as to rotate with said axles between positions of engagement and non-engagement with the ground.

5. An agricultural implement of the character described, including: a frame; an axle supported in horizontal laterally extending position on said frame; latch means for controlling rotation of said axle; a ground-engaging tool secured to said axle and being adapted to rotate between positions of engagement and non-engagement with the ground; and a wheel segment mounted on said axle so as to extend oppositely from said ground-engaging tool, said wheel segment comprising a diametral bar having a portion of its center bent to U-shaped form to provide a channel to fit partly around said axle, a bar bent to substantially semicircular form and having the ends thereof bent into axially extending positions to provide bracket plates, such bracket plates being secured to said diametral bar at points within the ends thereof and means extending around said bar and across the U-shaped portion of said diametral bar for clamping said U-shaped portion against said axle whereby to secure said wheel segment to said axle.

6. An agricultural implement of the character described, including: a frame; an axle supported in horizontal laterally extending position on said frame; latch means for controlling rotation of said axle; a ground-engaging tool secured to said axle and being adapted to rotate between positions of engagement and non-engagement with the ground; and a wheel segment mounted on said axle so as to extend oppositely from said ground-engaging tool, said wheel segment comprising a diametral bar having a portion of its center bent to U-shaped form to provide a channel to fit partly around said axle, a bar bent to substantially semicircular form and having the ends thereof bent into axially extending positions to provide bracket plates, such bracket plates being secured to said diametral bar at points within the ends thereof, means extending around said bar and across the U-shaped portion of said diametral bar for clamping said U-shaped portion against said axle whereby to secure said wheel segment to said axle, and a shoe detachably secured to said bar of substantially semi-circular form in position to ride on the ground when said wheel segment is disposed downwardly.

7. A cultivator of the character described, including: a frame having means adapted to engage the ground so as to limit the proximity of said frame to the ground; a rotary axle member having ground engaging tools mounted thereon so as to rotate between raised and lowered positions as said axle member rotates; means for securing said axle member to said frame in horizontal, laterally extending position, said means being adjustable to vary the vertical position of said axle member relative to said frame; a floating bar connected to said frame; a rotary member on said axle member having shoulder means; a pawl member movably mounted on said floating bar and engaging said shoulder means to prevent rotation of said axle member; and means for actuating said pawl member.

8. A cultivator of the character described, including: a frame having means adapted to engage the ground so as to limit the proximity of said frame to the ground; a rotary axle member having ground engaging tools mounted thereon so as to rotate between raised and lowered positions as said axle member rotates; means for securing said axle member to said frame in horizontal, laterally extending position, said means being adjustable to vary the vertical position of said axle member relative to said frame; a floating bar connected to said frame; means extending from said floating bar into engagement with said frame; a rotary member on said axle member having shoulder means; a pawl member movably mounted on said floating bar and engaging said shoulder means to prevent rotation of said axle member; and means for actuating said pawl member.

9. A cultivator of the character described, including: a frame; a plurality of axles supported in horizontal, laterally extending positions on said frame; a floating bar extending across said axles, comprising a pair of bars extending in parallel relationship providing a space therebetween; a plurality of U-shaped members extending from said floating bar into engagement with said axles; a dog member on each of said axles aligned with said space between said parallel bars; levers pivotally mounted on said floating bar so as to project through the space between said parallel bars into engagement with said dog members; means connecting said levers together to produce simultaneous movement thereof; and ground engaging tools mounted on said axles so as to rotate with said axles between positions of engagement and non-engagement with the ground.

10. A latch means of the character described, for controlling rotation of an axle member, comprising: a cylindrical body having an opening to fit said axle member, and a central radial flange having dogs formed thereon; a pair of bars extending laterally with respect to said axle member and lying upon opposite sides of said flange; U-shaped members extending from said bars around the end portions of said cylindrical body; and pawl means movably secured to said bars for engaging said dogs of said flange.

11. A latch means of the character described, for controlling rotation of an axle member, comprising: a cylindrical body having an opening to fit said axle member, a central radial flange having dogs formed thereon, and flanges at the ends thereof; a pair of bars extending laterally with respect to said axle member and lying upon opposite sides of said flange; U-shaped members extending from said bars around the end portions of said cylindrical body between said central flange and said end flanges; and pawl means movably secured to said bars for engaging said dogs of said central flange.

In testimony whereof, I have hereunto set my hand at Oxnard, California, this 24th day of March, 1932.

SAMUEL S. FURRER.